April 18, 1933. L. L. JONES 1,904,051
SOLDERING IRON
Filed Sept. 28, 1929
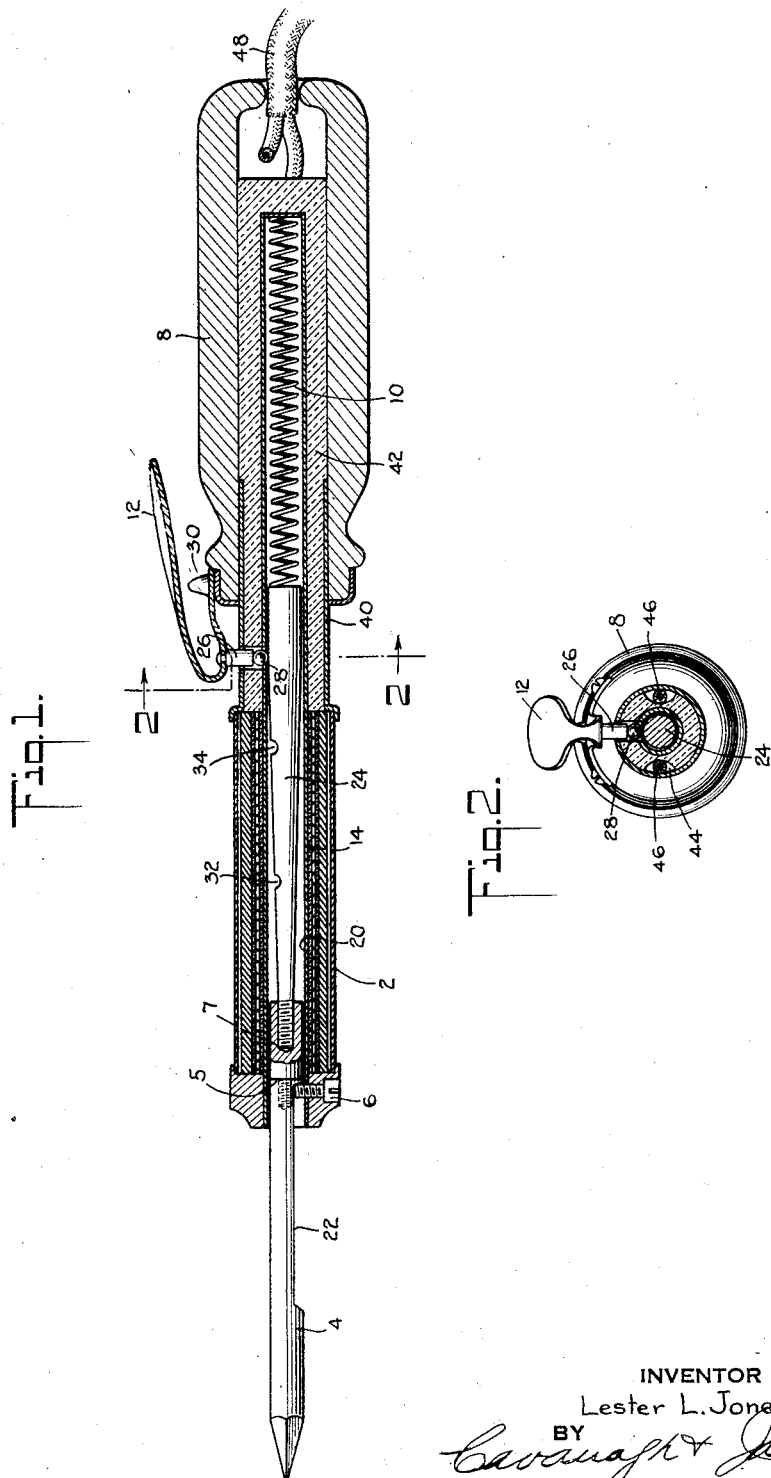
INVENTOR
Lester L. Jones
BY
Cavanagh & Jones
ATTORNEYS Patented Apr. 18, 1933

1,904,051

UNITED STATES PATENT OFFICE

LESTER L. JONES, OF ORADELL, NEW JERSEY

SOLDERING IRON

Application filed September 28, 1929. Serial No. 395,800.

This invention relates to soldering irons and more particularly to soldering irons which are to be used relatively intermittently.

It has long been a problem in using soldering irons to keep the point in good condition, that is to have it constantly coated with a continuous film of unoxidized solder. This problem is normally very acute where the soldering iron is used intermittently and on relatively small work, as for example, in experimental laboratories or in small scale production where the operator performs several operations between the soldering operations.

In such a case the soldering iron point corrodes and must be freshly prepared by cleaning or scraping in order to make a good soldered joint. If the point is kept fairly cool the solder will not oxidize and the point will keep in good condition. This is, however, very troublesome because it greatly increases the length of time required for soldering, and in some cases, where the metal parts to be joined are large, entirely prevents the proper fluxing of the solder.

One method of avoiding this difficulty, in the case of an electric soldering iron, is to use two degrees of heat selected by means of a snap switch or, in the case of an externally heated iron, to use two positions in the flame, one of which just heats the iron enough to keep the solder on the point liquid, while the other or higher heat position raises the temperature to the best value for soldering.

This method is, however, wasteful of time because of the fact that the whole iron cools to the lower temperature, and when the higher heat is employed an appreciable interval of time is required to heat up the point. Therefore, unless the operator starts the iron heating a sufficiently long time before using it, he must wait before his soldering operation can begin.

A similar problem arises in other operations where it also is desirable to have available several optionally selectable temperatures at the tip of a soldering iron. For example, a different temperature is required for soldering with hard solder than is desirable for soldering with soft solder. The same applies to a soldering operation performed upon large or heavy parts in comparison with a soldering operation performed upon light wires or similar connections. Another illustration is in the alternate use of solder and insulating or sealing wax, as is often the case in the manufacture of small electrical parts. Some times a joint is soldered and is subsequently covered with insulating wax, and at other times a unit, such as a condenser, is first sealed within a case by means of wax, and leads therefrom are subsequently soldered to terminals on the case. A low temperature is desirable for melting the wax relative to the higher temperature needed for the soldering operation.

The primary object of the present invention is to overcome the foregoing difficulties, and to provide a novel soldering iron structure and a method for using the same which will make it possible to control the temperature of the point or tip of the soldering iron without necessarily similarly controlling the temperature of the entire soldering iron. This I accomplish, generally, by providing a soldering iron comprising a heat retaining body of relatively large mass and a soldering tip of relatively small mass, and controlling the temperature of the tip by varying the heat transfer between the heat retaining body and the tip.

The temperature of the tip depends not only upon the heat transferred thereto from the heat retaining body, but also upon the heat radiated therefrom. Accordingly, another object of the present invention is to control the heat radiation from the soldering tip, and to make this radiation vary in the proper sense to advantageously cooperate with the applied variations in the heat transfer from the heat retaining body to the tip.

Another object of the present invention resides in the provision of a simple means for obtaining the desired variable heat transfer, and to this end I mount the soldering tip reciprocably on, and preferably in a longitudinal bore in the heat retaining body. The projection of the tip out of the body, and at the same time the extent of insertion of the other end of the tip into the body, are therefore simultaneously variable, and in the outward position the heat transfer from the body to the tip is reduced and the heat radiation from the tip is increased, whereas in the inward position the heat transfer from the body to the tip is increased and the heat radiation from the tip decreased. In this manner a variable temperature may be obtained at the tip of the soldering iron even though the temperature of the heat retaining body is not similarly varied, and may even be oppositely varied.

Another object of the present invention is to adapt such a temperature controllable soldering iron particularly for intermittent soldering such as was previously described. To this end the method of my invention includes reducing the heat transfer between the body and the tip by moving the tip outwardly from the body sufficiently to reduce the temperature of the tip to the melting point of solder in order to prevent oxidation of the solder on the tip between soldering operations, and further includes increasing the heat transfer between the body and the tip by moving the tip into the body during soldering operations in order to rapidly heat the tip to the soldering temperature. At the same time the radiation from the tip may be varied so that increased radiation is obtained between soldering operations and decreased radiation is obtained during soldering operations.

The invention as so far described is equally applicable to soldering irons which are externally heated as by a gas flame, and to electric soldering irons. A more specific object of the present invention resides in the provision of an electric soldering iron embodying my invention. In such a soldering iron the heat retaining body is heated in the customary manner by a resistor, which may itself constitute a part of the heat retaining body, and my invention is applied merely by constantly heating the body by means of the resistor, and controlling or varying the temperature of the tip by controlling the heat transfer to the tip and the heat radiation from the tip in the manner aforesaid. Obviously, with an iron embodying my invention the temperature of the tip depends upon and is established relative to the temperature of the heat retaining body. Inasmuch as the temperature of the heat retaining body is kept substantially constant in the case of a soldering iron of the electrically heated type, it follows that the temperature of the tip may likewise be kept constant for any given setting relative to the heat retaining body, so that my invention is particularly advantageously applicable to this type of iron, although it also is usefully applicable to a soldering iron of the externally heated type, and there avoids the necessity of accurately variably positioning the iron in the flame.

A still further object of the present invention is to so arrange the soldering iron that the soldering tip may be almost instantaneously heated to the higher temperature when the iron is about to be used. To this end I increase the temperature of the heat retaining body when the soldering iron is not in use, preferably simply by so constructing the iron that the heat radiation from the heat retaining body is reduced at the same time that the heat radiation from the tip is increased. This causes a rise in the temperature of the heat retaining body until a new equilibrium temperature is reached, and this rise in temperature insures that the soldering tip will be very rapidly raised to the soldering temperature when the tip is again inserted into the body of the iron.

To the accomplishment of the foregoing and such other objects as will hereinafter appear, my invention consists in the method and the soldering iron elements and their relation one to the other as hereinafter are more particularly described in the specification and sought to be defined in the claims. The specification is accompanied by a drawing in which:

Fig. 1 is a longitudinal section through a soldering iron embodying features of my invention; and Fig. 2 is a section taken in the plane of the line 2—2 in Fig. 1.

Referring to the drawing, the soldering iron consists generally of a heat retaining body 2 of relatively large mass, and a soldering point or tip 4 of relatively small mass, the latter being reciprocably mounted on and movable relatively to the body 2. The reciprocation of the tip 4 is limited between an extreme inward and an extreme outward position by stop means 6. The heat retaining body 2 is affixed to and supported by a heat insulating handle 8, within which there is housed resilient means 10 urging the tip 4 to its outward position. Manually operable means 12 is arranged to retain the tip at any position against the pressure of the resilient means 10, and is further arranged to lock the tip 4 in any of one or more selected positions. The heat retaining body 2 may be externally heated, as by a gas flame, but in the present instance is illustrated as being electrically heated by a resistor or resistance coil or winding 14 housed in a suitable annular electrically insulated winding space within the heat retaining body 2.

Considering the illustrated soldering iron more in detail, it will be observed that the heat retaining body 2 is preferably provided with a longitudinal bore 20, while the tip 4 is most simply made cylindrical in shape and of proper diameter to be received by the bore 20. A slot 22 may be cut along the tip 4 to define the limits or extent of movement of the tip 4 in cooperation with the stop means 6.

The tip 4 is provided with a rearwardly extending shank 24, which, if desired, may be made of a poor heat conducting material, against which the compression spring 10 bears. The shank 24 is preferably tapered, as shown, while the resilient manually operable means 12 carries a projection 26 which in turn presses upon a ball 28, and the pressure of the latter against the tapered surface 24 holds the shank and the tip 4 against outward movement. By manually depressing finger piece 12 its pressure on the ball 28 may be relieved, and the tip 4 immediately moves outwardly under the influence of spring 10. A projection 30 may be provided upon the handle 8, against which the manually operable finger piece 12 may fulcrum when the pressure on ball 28 is being relieved.

For locking the tip 4 against inward movement when the tool is being used the shank 24 is preferably provided with a hemi-spherical depression or recess 32, into which the ball 28 may set when the tip is forced into the iron the right distance. If desired, an additional recess 34 may be provided for holding the tip at an intermediate position in order to provide a lower soldering temperature than is obtainable when the tip 4 is inserted fully into the body 2 of the iron. The several temperatures obtainable may be selected for special operations, such as hard soldering, soft soldering, soldering of solid bodies, soldering of light connections, melting of wax or insulation, and so on, as well as the non-oxidation of solder between soldering operations.

Aside from the structural modifications necessitated by the movable elements needed for the practice of my invention, the iron may in other respects be conventional. The resistance winding may be made of heavy resistance wire of great length, so that the winding itself constitutes a major portion of the heat retaining body, or it may be made of fine resistance wire housed within a separate heat retaining body, as in the case here shown. It may also be a carbon or like resistor, in which case the resistor may also constitute the heat retaining body. The precise construction of the heating element, of course, forms no part of my present invention, and in the claims which follow when I speak of the soldering iron as having a heat retaining body and a resistor I am considering the resistor in its dual function, first, as a part of the heat retaining mass, and second, as a heat generating electrical conductor. The handle 8 may be made of wood or molded composition having heat insulating properties, and the iron proper may be mounted in the handle by means of a tube 40, the space 42 being filled with a preferably electrical and heat insulating filling material, and being provided with grooves or slots 44, best shown in Fig. 2, through which the wires 46 for the heating current may extend. The wires 46 may be brought together into a single extension wire 48, passing through the end of the handle 8 in the usual manner.

The iron may be designed with still another consideration in view, namely, to make the heating of the tip 4 especially quick when about to solder by causing the internal temperature of the heat retaining body 2 to be raised between soldering operations. To this end the extension of the tip 4 within the body 2 may be made particularly short, the good heat conducting portion of the tip 4 terminating in the present case just beyond the stop means 6, as is indicated at 5 on the drawing. This results in a considerably reduced dissipation of heat from the body 2, and the temperature thereof is raised until a new equilibrium temperature is established. The same result may be attained by permitting the tip 4 to extend further into the body 2, but at the same time making the material at the inner end thereof, as at 7, a poor heat conductor, such as iron. In consequence there is very little heat dissipated from the body 2 when the tip is extended, but there is a rapid heat transfer from the body 2 through the good heat conducting material at the forward portion of the tip 4 when the tip is inserted into the body.

In operation the tip 4 is pushed in by pressing the tip against the soldering iron stand, or against any other suitable object, which in some cases may be the object to be soldered. The locking means 12 retains the tip in its inward position against the force of the spring 10. In this position the tip is close to the resistor 14 and the heat retaining body 2, and only a small portion of the tip is exposed to the atmosphere for heat radiation, and consequently the temperature of the tip very quickly rises to the proper soldering temperature. This rise in temperature is almost instantaneous because of the fact that the main heat retaining body 2 is always at the proper high temperature, or even at a higher temperature, and therefore need not be raised in temperature, while the tip 4 is of relatively small mass and its temperature is readily raised.

When the soldering operation has been completed it is merely necessary to press the manually releasable locking means 12, whereupon the tip 4 is moved to its outward position by the spring 10. In this position the heat transfer between the heat retaining body 2 and the tip 4 is greatly reduced, while the radiating surface of the tip 4 is greatly increased, and the tip extension is so adjusted that the resulting temperature is held sufficiently high to melt the solder but not sufficiently high to oxidize the same. The release of the tip 4 may be accomplished not only by pressing finger piece 12 but also merely by laying the soldering iron on the soldering stand with the locking means 12 pointed downwardly, the weight of the soldering iron automatically releasing the locking means.

It will be apparent that while I have shown and described my invention in a preferred form, many changes and modifications may be made in the structure disclosed without departing from the spirit of the invention, defined in the following claims.

I claim:

1. A soldering iron comprising a handle and a heat retaining body, a soldering tip heated thereby and movably related thereto, and means located at the handle for controlling the movement of the tip in order to regulate the temperature of the tip.

2. A soldering iron comprising a heat retaining body, a soldering tip reciprocably mounted in the body, and a manually operable means located at the handle of the soldering iron for controlling the position of the tip in the body in order to control the temperature of the tip.

3. A soldering iron comprising a heat retaining body of relatively large mass, a soldering tip of relatively small mass one end of which is freely reciprocably mounted on the body, resilient means urging the tip outwardly and means for retaining the tip in any of a plurality of positions relative to the body in order to control the temperature of the tip.

4. A soldering iron comprising a heat retaining body of relatively large mass, a soldering tip of relatively small mass one end of which is reciprocably inserted in the body, resilient means urging the tip outwardly from the body, and manually operable locking means for retaining the tip at any desired position within the body.

5. A soldering iron comprising a heat retaining body having a longitudinal bore therein, a soldering tip reciprocably mounted in the bore of the body, resilient means urging the tip to an outward position, and manually releasable locking means for locking the tip at an inward position.

6. A soldering iron comprising a heat retaining body of relatively large mass having a longitudinal bore therein, a soldering tip of relatively small mass reciprocably mounted in the bore of the body, stop means for limiting the reciprocation of the tip, resilient means urging the tip to an outward position, and manually releasable locking means for locking the tip at an inward position.

7. An electric soldering iron comprising a heat retaining body, a resistor for heating the same, a soldering tip reciprocably mounted in the body, a heat insulating handle fixed to the body, resilient means urging the tip to an outward position, and manually operable means for locking the tip at an inward position.

8. An electric soldering iron comprising a heat retaining body of relatively large mass, a resistor for heating the same, a soldering tip of relatively small mass reciprocably mounted in the body in order to make the projection of the tip out of the body variable, stop means for limiting the reciprocation of the tip, a heat insulating handle fixed to the body, resilient means within the handle urging the tip to an outward position, and manually releasable locking means for locking the tip at an inward position.

9. A soldering iron comprising a hollow heat retaining body of relatively large mass, an elongated soldering tip of relatively small mass heated thereby and readily reciprocable therein, and mating stop means on the tip and on the body for positively limiting the free reciprocation of the tip between predetermined inward and outward limits.

10. A soldering iron comprising a hollow heat retaining body of relatively large mass, an elongated soldering tip of relatively small mass heated thereby and readily reciprocable therein, and mating stop means on the tip and on the body for positively limiting the free reciprocation of the tip between predetermined inward and outward limits, the heat transfer from the body to the tip in the inward position being made sufficient to rapidly heat the tip to the soldering temperature, and the heat transfer from the body to the tip in the outward position being adjusted to be only sufficient to keep the temperature of the tip at the melting point of the solder but not to oxidize the same.

11. A soldering iron comprising a hollow heat retaining body of relatively large mass, an elongated soldering tip of relatively small mass reciprocable therein and heated thereby, resilient locking means for normally fixing the position of the tip, and manually operable means for opposing and releasing the resilient locking means in order to permit variation of the position of the tip for temperature control.

12. A soldering iron comprising a hollow heat retaining body of relatively large mass, an elongated soldering tip of relatively small mass inserted therein and heated thereby, said tip being reciprocable in said body for a substantial distance, locking means to fix the projection of the tip from the body in order to control the temperature of the tip, and a manually operable finger piece to instantaneously release the locking means whenever it is desired to vary the temperature of the tip.

13. A soldering iron comprising an axially bored heat retaining body of relatively large mass, a handle secured to one end thereof, an elongated soldering tip of relatively small mass projecting from the other end thereof, the tip being inserted in and reciprocable in the body for a substantial distance in order to regulate the temperature of the tip, a control rod secured to said tip and extending through the body to the handle, and control means at the handle cooperating with said control rod for determining the position of the tip.

14. A soldering iron comprising an axially bored heat retaining body of relatively large mass, a handle secured to one end thereof, an elongated soldering tip of relatively small mass projecting from the other end thereof, the tip being inserted in and reciprocable in the body for a substantial distance in order to regulate the temperature of the tip, a control rod secured to said tip and extending through the body to the handle, and means at said handle and operable upon said control rod for moving the rod and with it the tip.

15. A soldering iron comprising a hollow heat retaining body of relatively large mass, a soldering tip of relatively small mass arranged movably within the body in order to permit of control of the temperature of the tip, the outer portion of said soldering tip being made of a good heat conducting material, and the inner end of said soldering tip being made of a poor heat conductor.

16. A soldering iron comprising a hollow heat retaining body of relatively large mass, a heating element associated therewith, an elongated soldering tip of relatively small mass the inner end of which is longitudinally reciprocable in the body in order to permit of control of the temperature of the tip, the outer portion of said reciprocable soldering tip being made of a good heat conducting material and the inner end of said soldering tip being made of a poor heat conductor, said poor heat conductor operating to minimize heat transfer from the large mass to the soldering tip when the soldering tip is moved outwardly relative to the body, thereby reducing heat radiation and increasing the temperature of the body in order to insure a rapid rise in temperature of the tip when the tip is so moved into the body as to bring the body into direct heat transfer relation with the portion of the tip having good heat conductivity.

17. A soldering iron comprising a hollow heat retaining body of relatively large mass, an elongated soldering tip of relatively small mass the inner end of which is freely longitudinally reciprocable within the large body, and control means at the handle of said iron for readily causing movement of the tip outwardly of the body in order to reduce the temperature of the tip, so that the temperature of body is automatically increased when the tip is thus moved outwardly in order to thereby insure a rapid rise in temperature of the tip when the tip is restored inwardly.

Signed at New York, in the county of New York and State of New York, this 24 day of September, A. D. 1929.

LESTER L. JONES.